United States Patent
Broomfield et al.

(10) Patent No.: US 11,418,091 B2
(45) Date of Patent: Aug. 16, 2022

(54) COOLING DEVICE FOR ROTARY ELECTRIC MACHINE

(71) Applicant: KOCH ENGINEERED SOLUTIONS, LLC, Wichita, KS (US)

(72) Inventors: Dylan Broomfield, Gansevoort, NY (US); Russel Hugh Marvin, Potsdam, NY (US); Matthew Honickman, Potsdam, NY (US)

(73) Assignee: KOCH ENGINEERED SOLUTIONS, LLC, Wichita, KS (US)

( * ) Notice: Subject to any disclaimer, the term of this patent is extended or adjusted under 35 U.S.C. 154(b) by 227 days.

(21) Appl. No.: 16/745,413

(22) Filed: Jan. 17, 2020

(65) Prior Publication Data
US 2021/0226511 A1    Jul. 22, 2021

(51) Int. Cl.
  *H02K 9/19*   (2006.01)
  *H02K 1/16*   (2006.01)
  *H02K 9/10*   (2006.01)
  *H02K 3/12*   (2006.01)
  *H02K 3/48*   (2006.01)

(52) U.S. Cl.
  CPC .............. *H02K 9/19* (2013.01); *H02K 1/16* (2013.01); *H02K 3/12* (2013.01); *H02K 3/48* (2013.01); *H02K 9/10* (2013.01)

(58) Field of Classification Search
  CPC .............. H02K 1/20; H02K 3/24; H02K 9/19
  See application file for complete search history.

(56) References Cited

U.S. PATENT DOCUMENTS

| | | |
|---|---|---|
| 5,189,325 A | 2/1993 | Jarczynski |
| 6,313,556 B1 | 11/2001 | Dombrovski et al. |
| 8,816,546 B2 | 8/2014 | Bywaters et al. |
| 9,362,785 B2 | 6/2016 | Marvin et al. |
| 10,348,146 B2 | 7/2019 | Marvin et al. |
| 11,251,681 B2 | 2/2022 | Marvin et al. |
| 2002/0163275 A1 | 11/2002 | Hsu |
| 2003/0011253 A1 | 1/2003 | Kalsi et al. |
| 2008/0197724 A1 | 8/2008 | Cullen et al. |
| 2012/0279242 A1* | 11/2012 | Seybold ............ B60H 1/00342 62/190 |
| 2014/0300220 A1* | 10/2014 | Marvin .................... H02K 3/24 310/54 |
| 2015/0028728 A1 | 1/2015 | Carpentier et al. |
| 2017/0194838 A1 | 7/2017 | Marvin et al. |

FOREIGN PATENT DOCUMENTS

| | | | |
|---|---|---|---|
| CN | 106655564 B | 5/2019 | |
| DE | 102008016758 A1 | 10/2009 | |
| WO | WO-2020191167 A1 * | 9/2020 | ............... H02K 3/24 |

* cited by examiner

*Primary Examiner* — Quyen P Leung
*Assistant Examiner* — Minki Chang
(74) *Attorney, Agent, or Firm* — Lathrop GPM LLP

(57) ABSTRACT

A rotary electric machine includes a stator extending along an axis and having teeth arranged about the axis. The teeth are circumferentially spaced apart by slots. Conductors extend around the teeth and through the slots. The conductors are electrically connected to one another to form phases. A cooling device is provided in at least one winding slot. The cooling device includes an outer tube and an inner tube provided in the outer tube such that cooling fluid flows in a first axial direction within the inner tube and a second axial direction opposite the first axial direction within the outer tube.

21 Claims, 7 Drawing Sheets

COOLING DEVICE FOR ROTARY ELECTRIC MACHINE

TECHNICAL FIELD

The present invention relates generally to rotary electric machines, and specifically to a cooling device for rotary electric machines.

BACKGROUND

All electric motors and generators, i.e., rotary electric machines, generate heat during operation. The heat can be removed using a fluid such as air or a liquid. In some examples, the cooling structure is provided in the winding slot to provide more direct contact with the windings and thereby more effectively remove heat generated therefrom.

SUMMARY

In one example, a rotary electric machine includes a stator extending along an axis and having teeth arranged about the axis. The teeth are circumferentially spaced apart by slots. Conductors extend around the teeth and through the slots. The conductors are electrically connected to one another to form phases. A cooling device is provided in at least one winding slot. The cooling device includes an outer tube and an inner tube provided in the outer tube such that cooling fluid flows in a first axial direction within the inner tube and a second axial direction opposite the first axial direction within the outer tube.

In another example, a cooling device is provided for a stator having teeth defining slots therebetween and conductors extending around the teeth and through the slots. The cooling device includes an outer tube having first and second ends and defines a passage. The outer tube is received in one of the slots circumferentially between conductors in the slot. An inner tube having open first and second ends defines a passage. The inner tube extends within the passage of the outer tube. The second end of the outer tube is fluidly sealed such that cooling fluid flows in a first axial direction within the inner tube and a second axial direction opposite the first axial direction within the outer tube.

Other objects and advantages and a fuller understanding of the invention will be had from the following detailed description and the accompanying drawings.

DETAILED DESCRIPTION

Figure 1:
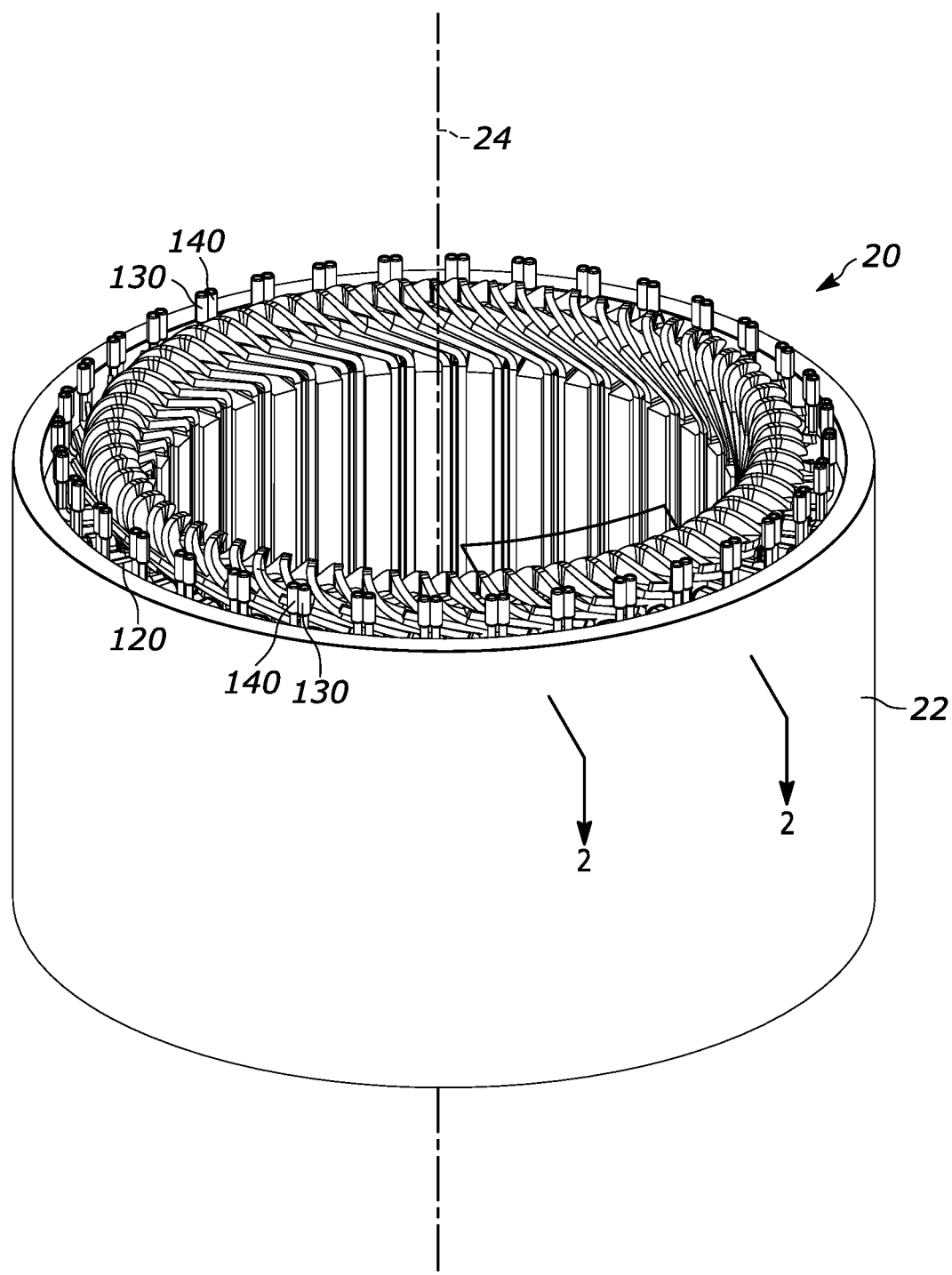
FIG. 1 is a front view of a rotary electric machine having one example cooling device.
Figure 2:
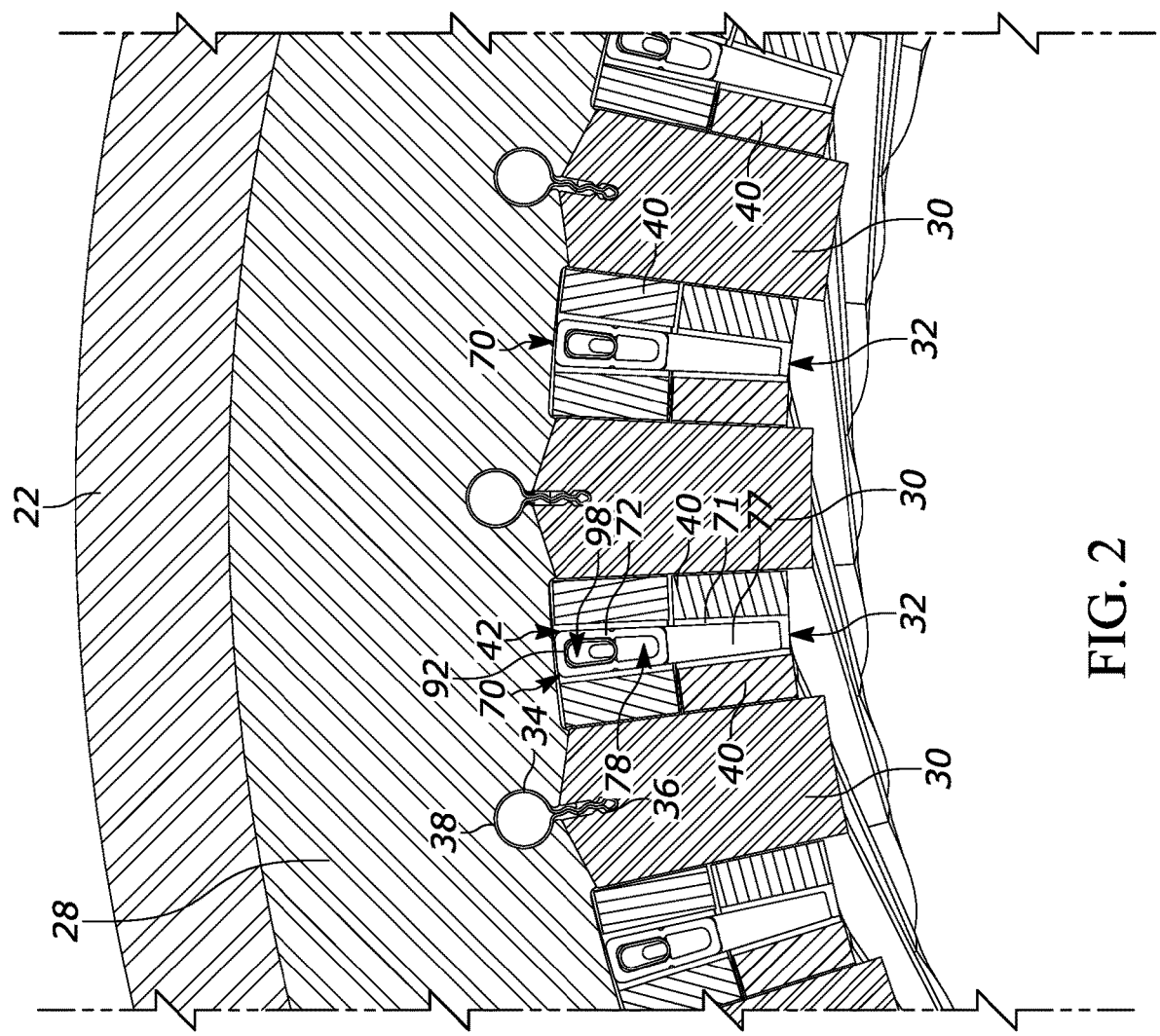
FIG. 2 is a section view of the rotary electric machine taken along lines 2-2 of FIG. 1.

The present invention relates generally to rotary electric machines, and specifically to a cooling device for rotary electric machines. Referring to FIGS. 1-2, one example rotary electric machine 20 includes a stator 22 extending about and along an axis 24. The stator 22 includes a ring-shaped core 28 formed from stacked laminations formed from an electrically conductive material. Teeth 30 extend radially inward from the core 28 towards the axis 24. The teeth 30 are arranged circumferentially about the axis 24 and extend substantially the entire axial length of the stator 22. The teeth 30 can be releasably connected to the core 28 with tooth retention devices 34 or integrally formed therewith (not shown). As shown, each tooth retention device 34 extends into a slot 36 in one of the teeth 30 and a slot 38 in the core 28. Regardless, the teeth 30 are circumferentially spaced apart from one another by winding slots 32.

Windings or coils 40 formed from one or more conductors, e.g., electrically conductive material such as copper, are wound around the teeth 30 and pass through the winding slots 32. In one example, the windings 40 are wound in a 3-phase configuration such that a portion of the windings are in phase A, a portion of the windings are in phase B, and a portion of the windings are in phase C. Each phase A-C receives the same or substantially the same amount of current. Other phase configurations are contemplated. Multiple windings 40 can be electrically connected in series or in parallel and still receive the same amount of current. In a 3-phase configuration, phases can be connected in either a wye or delta configuration.

The windings 40 can be wound onto the stator 22 in any number of known manners, e.g., concentrated wound, distributed wound or hairpin wound. As shown, the windings 40 are formed from rectangular wire bent into a diamond shape and distributed wound around the teeth 30. The windings 40 are oriented in the winding slot 32 such that in cross-section the length (the longer dimension) extends radially towards the axis 24. The width (the smaller dimension) extends generally circumferentially about the axis 24. Multiple windings 40 in the same winding slot 32 are arranged abutting or adjacent one another in the radial direction and abutting or adjacent the associated tooth 30.

A circumferential space or gap 42 can be formed in the winding slot 32 between adjacent pairs of windings 40. A cooling device 70 is provided within each gap 42 for cooling the windings 40 during operation of the rotary electric machine 20. A liner 71 formed from electrically insulating material, e.g., an aramid polymer, is provided in the gap 42 and is wrapped around the cooling device 70. Consequently, the liner 71 is provided circumferentially between the windings 40 in the same winding slot 32 and circumferentially between the cooling device 70 and each winding 40. The liner 71 can extend substantially the entire axial and radial lengths of the winding slot 32. Alternatively, the liner 71 can be omitted (not shown) such that the cooling device 70 abuts multiple windings 40 in the winding slot 32.

Figure 3A:
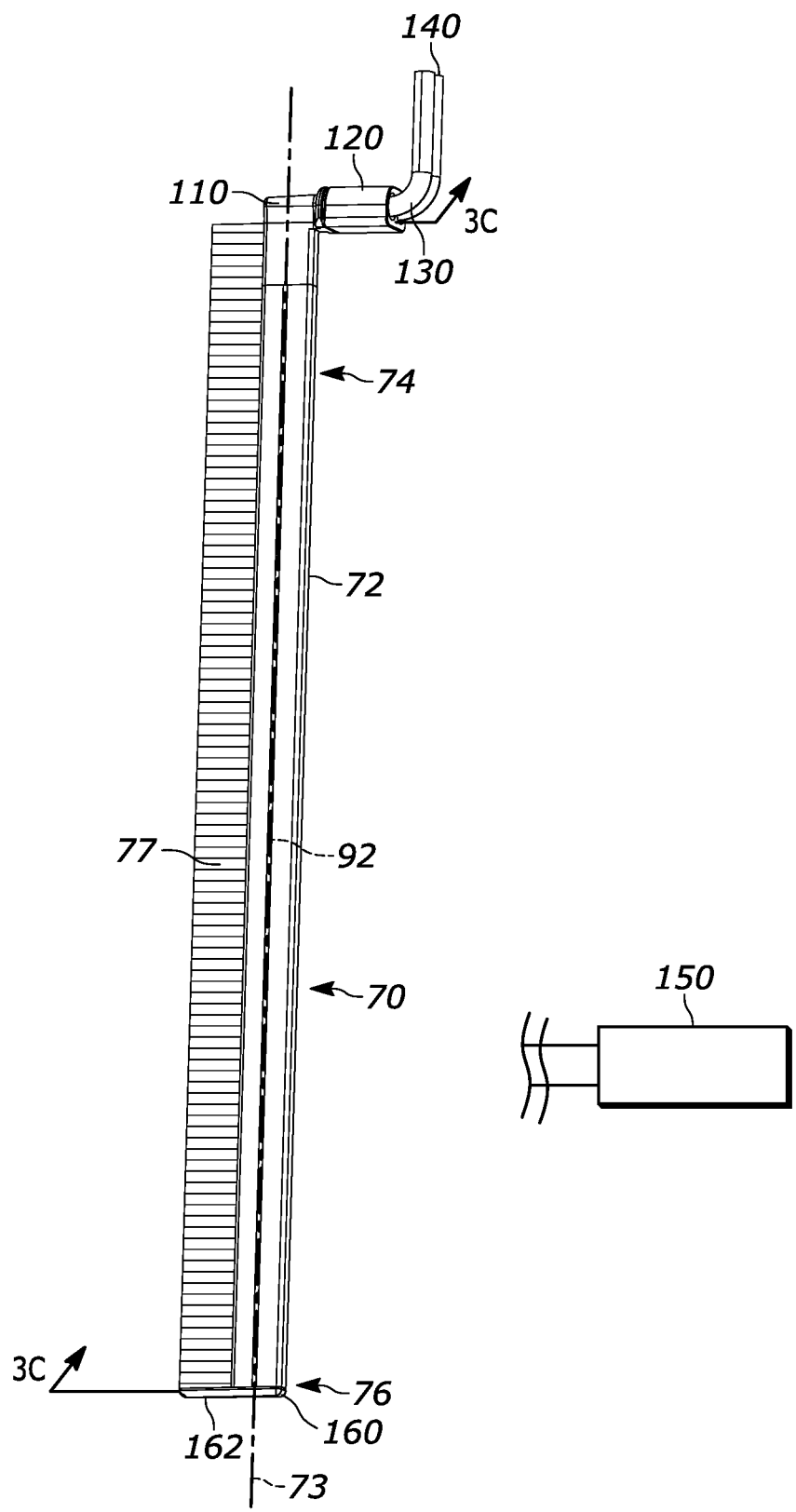
FIG. 3A is a front view of a cooling device for the rotary electric machine.
Figure 3B:
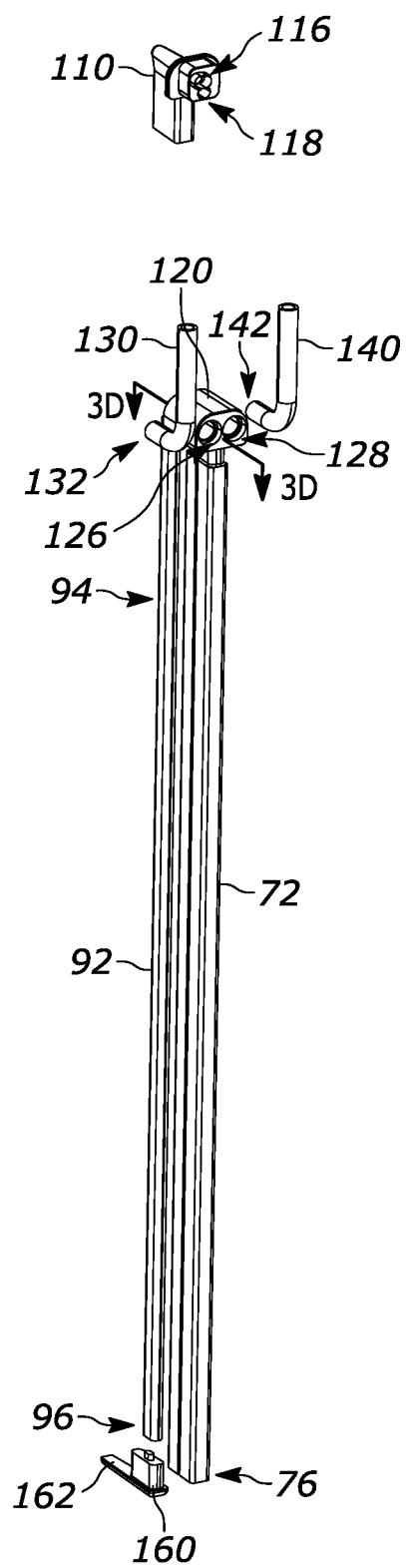
FIG. 3B is an exploded view of a portion of the cooling device of FIG. 3A.

Referring to FIGS. 3A-3B, the cooling device 70 includes first and second tubes 72, 92 for providing a bi-directional flow path for cooling fluid within each winding slot 32. As shown, the first tube 72 is on outer tube and the second tube 92 is an inner tube. A conductive tab 77 formed from stacked laminations is secured along the length of the first tube 72. The tab 77 can be secured to the first tube 72 via brazing, soldering, etc. To this end, the tab 77 can be secured to the first tube 72 in the manner shown and described in U.S. application Ser. No. 15/394,522, the entirety of which is incorporated by reference herein. The tubes 72, 92 and tab 77 can be formed from conductive materials, such as aluminum and copper-based materials. The tubes 72, 92, and tab 77 can be formed from the same material or different materials.

Figure 3C:
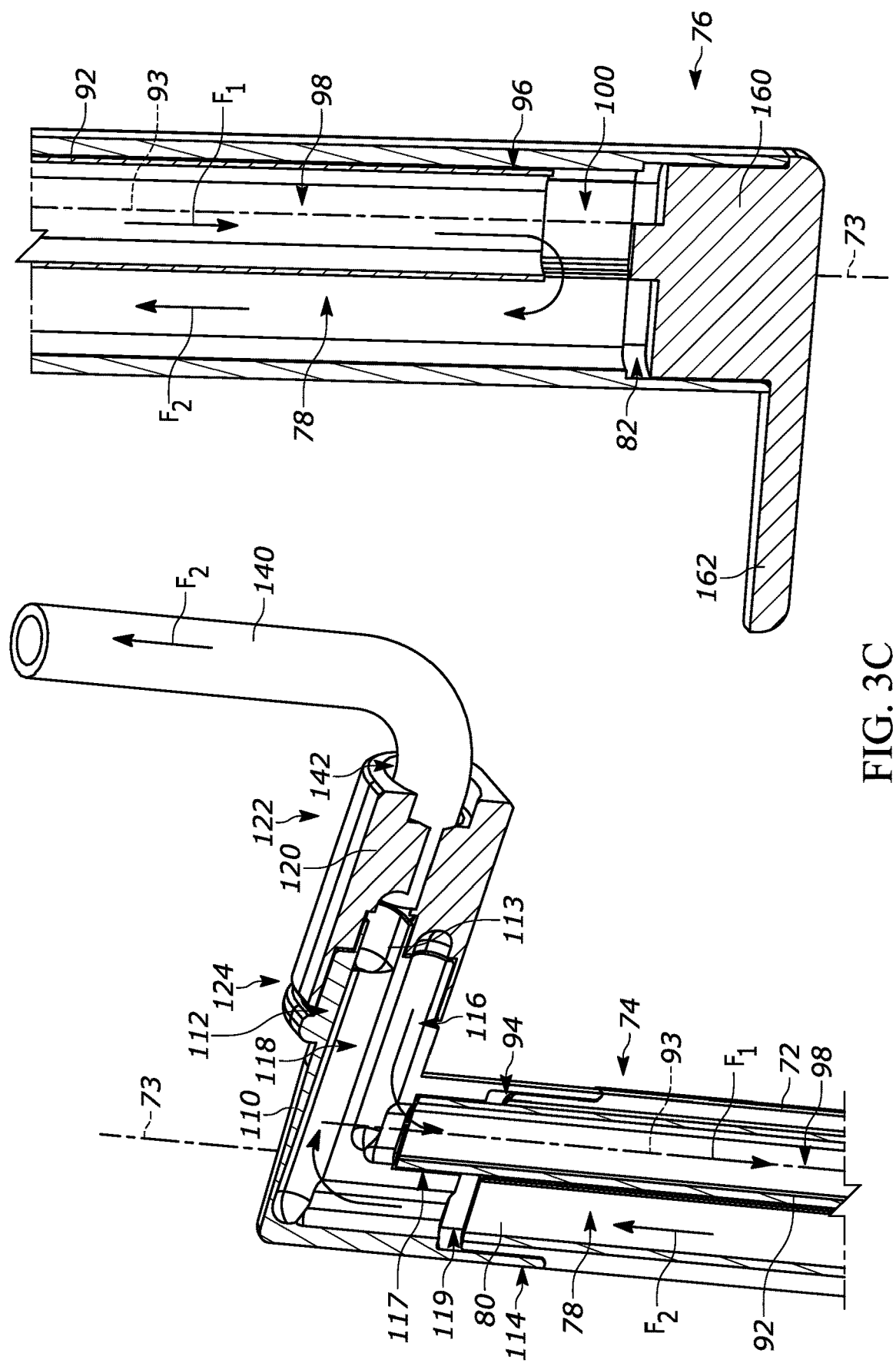
FIG. 3C is a section view of the cooling device taken along lines 3C-3C of FIG. 3A-3A.

As further shown in FIG. 3C, the first tube 72 extends along a centerline 73 from a first end 74 to a second end 76. A passage 78 extends the entire length of the first tube 72. A hollow projection 80 is provided at the first end 74 and extends along the centerline 73. A countersink 82 extends from the second end 76 towards the first end 74 and is coaxial with the centerline 73.

The second tube 92 extends along a centerline 93 from a first end 94 to a second end 96. A passage 98 extends the entire length of the second tube 92. The second tube 92 is positioned within the passage 78 of the first tube 72. As shown, the centerlines 73, 93 of the first and second tubes 72, 92 are offset from one another.

Figure 4:
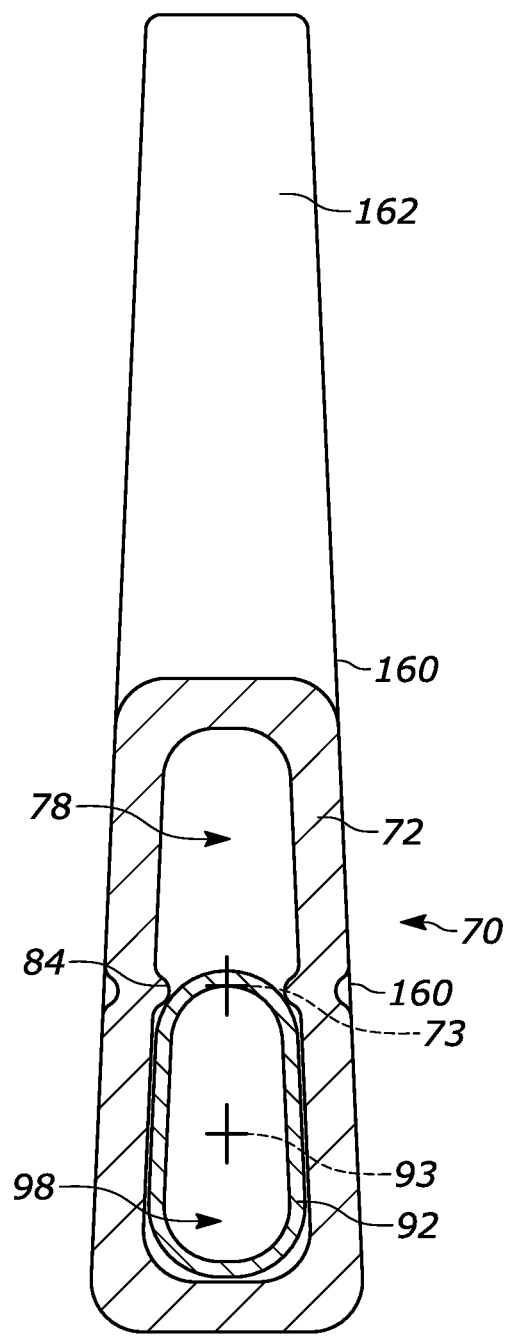
FIG. 4 is a top view of a portion of the cooling device.

The first and second tubes 72, 92 can be secured to one another. In one example, one or more projections 84 (see FIG. 4) are provided along the length of the first tube 72 and extend radially towards the centerline 73. The projections 84 engage the second tube 92 to pin or secure the second tube in place within the first tube 72. The projections 84 can be formed by crimping the first tube 72 inward into the passage 78 while the second tube 92 is disposed therein. Alternatively, the first tube 72 can be drawn, e.g., cold drawn, through a die to include the projections 84. In any case, the projections 84 prevent or limit relative axial and rotational movement between the tubes 72, 92.

Alternatively or additionally, the first and second tubes 72, 92 can be secured to one another with a metallurgical bond, which can be accomplished by, for example, a brazed connection, a welded connection, a solid state welded connection or a soldered connection. The connection can extend the entire length of the second tube 92 or along portions of the length of the second tube. In another example, the first and second tubes 72, 92 are not secured to one another (not shown).

Regardless, the second tube 92 is positioned within the first tube 72 such that the first end 94 of the second tube extends axially beyond the first end 74 of the first tube (FIG. 3B). The lengths of the first and second tubes 72, 92 are configured such that this positions the second end 96 of the second tube 92 offset from the second end 76 of the first tube. More specifically, the second end 96 of the second tube 92 is longitudinally recessed or spaced from the countersink 82 to form a longitudinal space or gap 100 therebetween. Accordingly, the tubes 72, 92 can have the same axial length and be axially shifted or offset from one another to achieve the gap 100.

An end cap 110 is secured to the first ends 74, 94 of the first and second tubes 72, 92. The end cap 110 extends from a first end 112 to a second end 114. As shown, the end cap 110 is substantially L-shaped. The end cap 110 includes a first passage 116 and a second passage 118 each extending the length of the end cap. The first passage 116 is fluidly connected to the passage 98 in the second tube 92. The second passage 118 is fluidly connected to the passage 78 in the first tube 72.

A hollow projection 113 is provided on the first end 112 of the end cap 110 and is aligned with the second passage 118. A countersink 119 is provided in the second end 114 of the end cap 110 for slidably receiving the projection 80 on the first end 74 of the first tube 72. The second end 114 of the end cap 110 also includes a recess 117 for slidably receiving the first end 94 of the second tube 92. The positioning and depths of the recess 117 and countersink 119 in the second end 114 of the end cap 110 longitudinally offset the first ends 74, 94 from one another, thereby offsetting the second ends 76, 96 from one another.

Figure 3D:
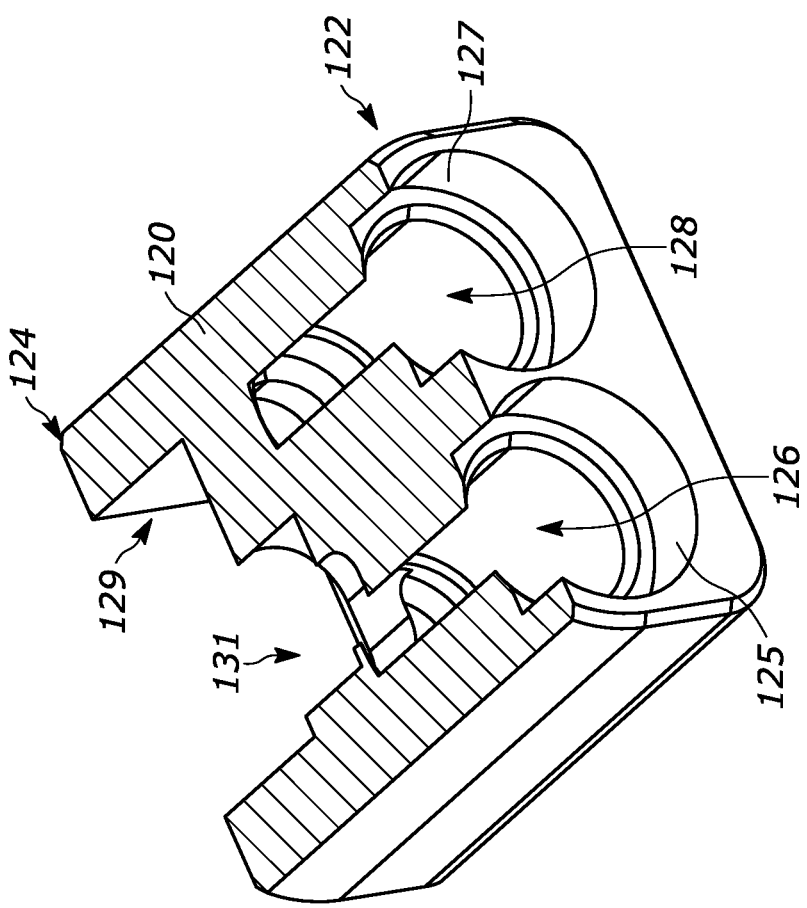
FIG. 3D is a section view of the cooling device taken along lines 3D-3D of FIG. 3B-3B.

A coupling 120 (see also FIG. 3D) is secured to the first end 112 of the end cap 110. The coupling 120 extends from a first end 122 to a second end 124. First and second passages 126, 128 extend the length of the coupling 120. The passages 126, 128 include respective countersinks 125, 127 at the first end 122. A first recess 129 extends into the second end 124 and is in fluid communication with the second passage 128. A second recess 131 extends from the first recess 129 to the first passage 126 for fluidly connecting the same. The first recess 129 slidably receives the first end 112 of the end cap 110. The second recess 131 slidably receives the projection 113 on the first end 112. Consequently, the first passage 126 is fluidly connected to the first passage 116 in the end cap 110. The second passage 128 is fluidly connected to the second passage 118 in the end cap 110.

The interfaces between the first and second tubes 72, 92, the end cap 110, and the coupling 120 can be fluidly sealed in several ways. For example, the interfaces can be brazed, soldered, welded (such as solid state welding) or crimped together. In each case, the interfaces are securely held together in a fluid-tight manner.

A pair of tubes 130, 140 extends into the first and second passages 126, 128, respectively, in the first end 122 of the coupling 120. The tubes 130, 140 are fluidly connected to a reservoir 150 (see FIG. 3A) holding cooling fluid. The cooling fluid can be, for example, water, ethylene glycol or mixtures thereof.

An end cap 160 (FIGS. 3A and 3C) is received in the countersink 82 in the second end 76 of the first tube 72 for closing the second end without sealing or closing the second end 96 of the second tube 92. In other words, the end cap 160 does not eliminate the gap 100. This forms a closed path for the flow of cooling fluid through the cooling device 70. A projection 162 on the end cap 160 receives the tab 77 of laminations.

The cooling device 70 is oriented in the winding slot 32 such that the end cap 110 extends from the tubes 72, 92 radially outward and away from the axis 24 (see FIGS. 1 and 2). The end cap 110 and coupling 120 are in close proximity with or engaging the axial (top as shown) end of the core 28. The tab 77 extends radially inward from the first tube 72 towards the axis 24. The liner 71 can extend around the tab 77.

In operation (see FIGS. 1 and 3B), cooling fluid flows from the reservoir 150, through the tube 130 into the passage 126, through the passage 116, and into the passage 98 at the first end 94 of the second tube 92. The cooling fluid flows downward (as shown) in the manner indicated by the arrow $F_1$ through the winding slot 32 and between the windings 40. The cooling fluid exists the passage 98 at the second end 96 of the second tube 92 and is turned around in the gap 100 by the end cap 160.

This configuration allows the cooling fluid to then pass upward (as shown) in the manner indicated by the arrow $F_2$ through the passage 78 in the first tube 72. The cooling fluid exits the passage 78 at the first end 74 of the first tube 72, flows through the passages 118, 128, and exits the cooling device 70 through the tube 140. The cooling device 70 therefore provides for bidirectional flow of cooling liquid within the winding slot 32 associated therewith. It will be appreciated that the cooling liquid could also flow in the opposite direction, namely, in the direction $F_1$ through the tube 140 and in the direction $F_2$ through the tube 130.

In either case, the cooling fluid flows in a U-shaped or substantially U-shaped loop entirely within the winding slot 32. In other words, the cooling fluid does not exit the winding slot 32 between entering the second tube 92 and exiting the first tube 72, thereby avoiding cooling loops around the teeth 30. This helps reduce circulating currents and increase motor performance.

Moreover, providing bidirectional cooling within the winding slot 32 increases the surface area over which the cooling fluid interacts with the windings 40, thereby increasing the ability of the cooling device 70 to remove unwanted heat from the windings. To this end, placing the cooling device 70 either in contact with the windings 40 (when the liner 71 is omitted) or in close proximity therewith (when the liner is present) provides an efficient cooling path for removing heat from the windings during operation.

The cooling device 70 described herein is also advantageous in that a bidirectional cooling path is provided without requiring multiple passages in a single tube. Such configurations can be difficult to manufacture, costly, and can only be made with a limited amount of materials. On the other hand, using two tubes inserted in one another to provide bidirectional cooling is easy to manufacture, cheaper, and allows for a greater variance in materials to be used.

Furthermore, the L-shaped configuration of the end cap 110 allows the cooling device 70 to occupant a minimal amount of space longitudinally beyond the winding slots 32. This both enables and facilitates a distributed wound configuration of the windings 40, which tend to loop closely to the top and bottom of the teeth 30.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A rotary electric machine comprising:
    a stator extending along an axis and having teeth arranged about the axis, the teeth being circumferentially spaced apart by slots;
    conductors extending around the teeth and through the slots, the conductors being electrically connected to one another to form phases; and
    a cooling device provided in each slot, the cooling device including an outer tube and an inner tube provided in the outer tube such that a cooling fluid flows in a first axial direction within the inner tube and a second axial direction opposite the first axial direction within the outer tube; and
    an end cap secured to the outer tube for closing an end of the outer tube such that the cooling fluid flows from the first axial direction to the second axial direction entirely within the slots.

2. The rotary electric machines recited in claim 1, wherein the cooling device is positioned circumferentially between the conductors in the slot.

3. The rotary electric machine recited in claim 2, wherein the conductors in the slot are part of a same winding.

4. The rotary electric machine recited in claim 2, further comprising a liner formed from a thermally conductive material extending around the cooling device and circumferentially between the conductors.

5. The rotary electric machine recited in claim 1, further comprising a tab including a stack of laminations formed from thermally conductive material secured to the outer tube and positioned circumferentially between the conductors in the slots.

6. The rotary electric machine recited in claim 1, wherein the outer and inner tubes are made from an electrically conductive material.

7. The rotary electric machine recited in claim 1, wherein the outer and inner tubes are secured to one another with a metallurgical bond.

8. The rotary electric machine recited in claim 1, wherein the outer and inner tubes are secured to one another with a crimped connection.

9. The rotary electric machine recited in claim 1, wherein the outer tube has a projection extending radially inward into engagement with the inner tube to prevent relative movement therebetween.

10. The rotary electric machine recited in claim 1, wherein the conductors are distributed wound.

11. The rotary electric machine recited in claim 1, wherein the conductors are concentrated wound.

12. The rotary electric machine recited in claim 1, wherein the conductors are hairpin wound.

13. The rotary electric machine recited in claim 1, wherein the cooling fluid flows through the inner tube prior to flowing through the outer tube.

14. The rotary electric machine recited in claim 1, wherein the cooling fluid flows through the outer tube prior to flowing through the inner tube.

15. A cooling device for a stator having teeth defining slots therebetween and conductors extending around the teeth through the slots, comprising:
    an outer tube having first and second ends and defining a passage, the outer tube being received in one of the slots circumferentially between the conductors in the slots; and
    an inner tube having open first and second ends and defining a passage, the inner tube extending within the passage of the outer tube, the second end of the outer tube being fluidly sealed such that a cooling fluid flows in a first axial direction within the inner tube and a second axial direction opposite the first axial direction within the outer tube,
    an outer end cap connected to the first ends of the inner and outer tubes for fluidly connecting the inner and outer tubes to a reservoir of the cooling fluid; and
    an inner end cap closing the passage at the second end of the outer tube such that the cooling fluid flows in the first axial direction within the inner tube and the second axial direction opposite the first axial direction within the outer tube.

16. The cooling device recited in claim 15, wherein the cooling fluid flows through the inner tube prior to flowing through the outer tube.

17. The cooling device recited in claim 15, further comprising a tab including a stack of laminations formed from thermally conductive material secured to the outer tube and configured to be positioned circumferentially between the conductors in the slots.

18. The cooling device recited in claim 15, wherein the cooling fluid flows in and between the first and second axial directions entirely within the slots.

19. The cooling device recited in claim 15, wherein the outer tube includes a projection extending radially inward into engagement with the inner tube for preventing relative movement therebetween.

20. The cooling device recited in claim 15, further comprising a liner formed from a thermally conductive material extending around the cooling device and circumferentially between the conductors.

21. The cooling device recited in claim 15, wherein the conductors are distributed wound.

* * * * *